United States Patent [19]
Heuke

[11] Patent Number: 6,122,855
[45] Date of Patent: Sep. 26, 2000

[54] SEQUINS MOUNTING STUD FOR FISHING LURES

[76] Inventor: Thomas E. Heuke, 619 Garfield, Lincoln, Nebr. 68502

[21] Appl. No.: 08/717,703

[22] Filed: Sep. 23, 1996

[51] Int. Cl.[7] ................................................. A01K 85/00
[52] U.S. Cl. ...................... 43/42.09; 43/42.26; 43/42.32; 43/42.39; 43/42.33
[58] Field of Search ................ 43/42.32, 42.33, 43/42.34, 42.09, 42.26, 42.39

[56] References Cited

U.S. PATENT DOCUMENTS

| | | | |
|---|---|---|---|
| 271,424 | 3/1883 | Comstock . | |
| 497,962 | 5/1893 | D'Ivernois | 43/44.81 |
| 1,067,178 | 7/1913 | Lambert | 43/42.34 |
| 1,723,557 | 8/1929 | Ono | 43/42.34 |
| 2,251,593 | 8/1941 | Mangle | 43/42.34 |
| 2,765,572 | 10/1956 | Woolfe | 43/42.34 |
| 2,875,543 | 3/1959 | Sylvester et al. | 428/30 |
| 2,913,848 | 11/1959 | Hildebrandt | 43/42.32 |
| 3,343,296 | 9/1967 | Davis | 43/42.34 |
| 3,672,086 | 6/1972 | Terreni | 43/42.09 |
| 3,881,272 | 5/1975 | Parker | 43/42.34 |
| 4,035,945 | 7/1977 | Newman | 43/42.15 |
| 4,199,888 | 4/1980 | Barnes | 43/42.33 |
| 4,617,753 | 10/1986 | Pauley | 43/42.09 |
| 4,785,569 | 11/1988 | Thomas | 43/42.31 |
| 5,077,930 | 1/1992 | Berry | 43/42.32 |
| 5,088,226 | 2/1992 | Bazinet | 43/42.03 |
| 5,209,007 | 5/1993 | Southerland | 43/42.09 |
| 5,456,040 | 10/1995 | Dickens | 43/42.34 |
| 5,551,185 | 9/1996 | Reed | 43/42.39 |
| 5,588,246 | 12/1996 | Hill | 43/42.34 |

OTHER PUBLICATIONS

Karl T. White, *Fishing Tackle Antiques and Collectables*, Nov. 1995 p. 151 B3 "Charmer" p. 87 A14 "Wonderlure" and p. 153 A5 "Wonderlure" p. 43 A1 "Flying Helgramite Lure" (Comstock,Pat. No. 271,424).
DO–IT Corporation, DO–IT Molds, Catalog No. 96, p. 2.

*Primary Examiner*—Kurt Rowan

[57] ABSTRACT

An improved fishing device and accessory for fishing lures in which sequin mounting stud (26) on lead jig head (22) allows quick exchange and attachment of predator fish attracting reflective sequins (30B) and (30A). Mounting stud (26) utilizes a mounting stud sequin retainer (28) to hold sequins (30B) and (30A) on mounting stud (26). Sequins (30B) and (30A) coming in many colors and variations combine to give a multiplicity of new color, reflection, and erratic motion changes to effectively enhance the attractive abilities of the fishing lure to predator fish.

6 Claims, 4 Drawing Sheets

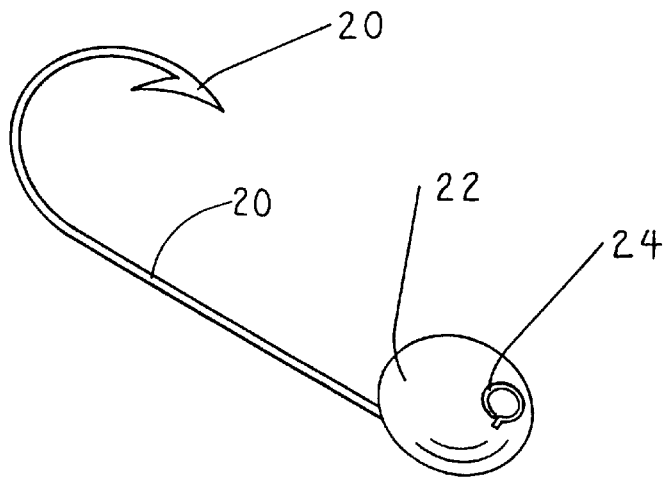
FIG. 1 PRIOR ART
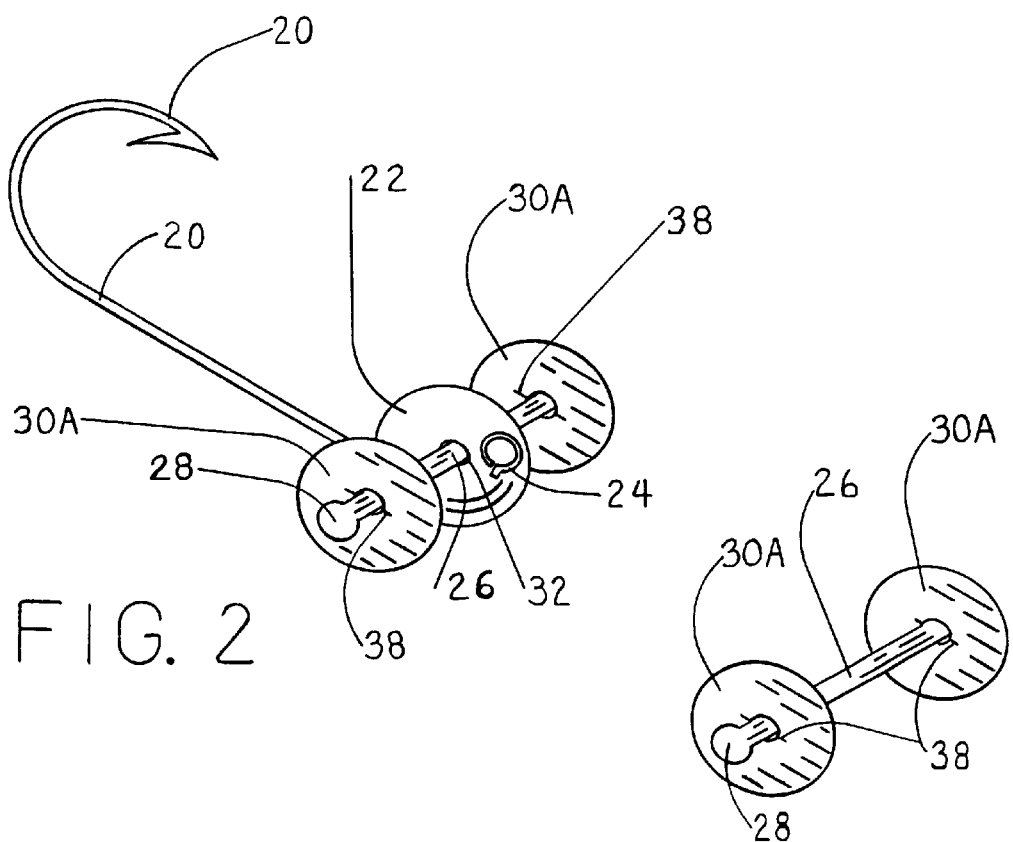
FIG. 2
FIG. 3

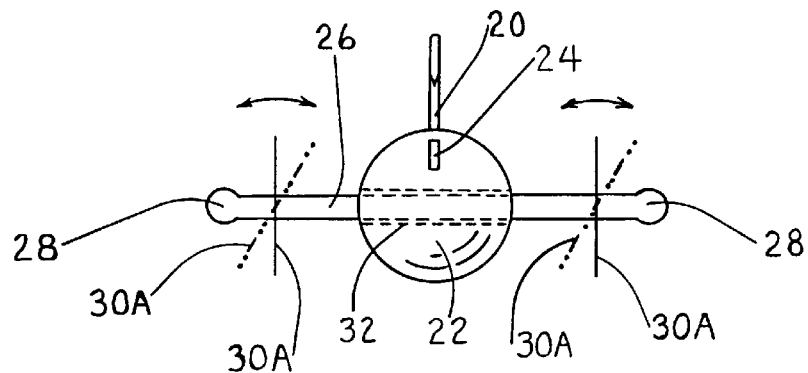
FIG. 4
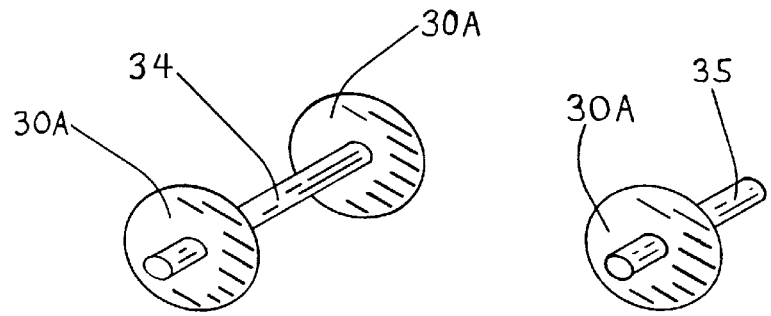
FIG. 5A    FIG. 5B
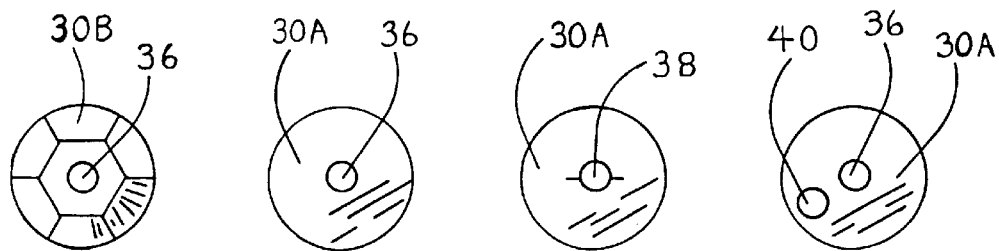
FIG. 6A    6B    6C    6D

SEQUINS MOUNTING STUD FOR FISHING LURES

BACKGROUND

1. Field of Invention

This invention relates to fishing, specifically to the use of reflection, coloration, and motion to attract and catch fish with fishing lures, by using detachable sequins and latex rubber materials, and beads.

2. Description of Prior Art

From the very first fish hook made from bone or shell and a stone for weight, there has been a steady improvement and search to attract and catch fish. The patent to D'Ivernois, U.S. Pat. No. 497,962, May 23, 1893, gives basis for a simple lead head jig. The lead head jig is still a viable selection as a fish lure. They are painted a myriad of colors. Even the best of paint is subject to chipping off as the jigs sometimes hit tree limbs and rocks when casting. Paint is softened and affected when touched by often mounted soft plastic or rubber baits and their oils. Paint is not a coloration that is easily changed, other than repainting. Sylvester, U.S. Pat. No. 2,875,543, Mar. 3, 1959, suggested a plastic decorative reflective material, that Barnes, U.S. Pat. No. 4,199,888, Apr. 29, 1980, applied to a fish lure as an adhesive tape in an effort to add coloration and reflection to his lure. More recently Berry, U.S. Pat. No. 5,077,930, Jan. 7, 1992, applied reflective adhesive tape to a bendable lure. Several products on the market today, suggest the use of lure tape as an alternative or adjunct to paint. Lure eyes in lure tape form are also available. Thus color can be changed on a lure easier than paint, but still the change is not easy when fishing. The angler must cut the material precisely with scissors to cover the lure body, so the change in tape color is usually not done while fishing but at home. Often the tapes don't adhere well to the lure surface because the adhesive fails at the edges. If the lure body has curvature, as many do have to simulate fish, the tape adhesive doesn't contact the lure surface intimately, and the tape doesn't follow the surface contour smoothly, resulting in wrinkles. Sometimes lure tapes are also affected by soft plastic bait oils and they can be affected by heat from the sun, especially on metal lures. They can leave a sticky adhesive residue on the lure surface that attracts dirt. Occasionally they bond a little too well and can pull original paint from the older lures. The lure tape, once used and removed, is usually not able to be reapplied and is thus discarded. The lure tapes are sold in many colors and reflective patterns, but are usually sold in large sheets making it difficult and expensive to sample different patterns.

Lure eyes for soft plastic lures were suggested by Southerland, U.S. Pat. No. 5,209,007, May 11, 1993 and Thomas, U.S. Pat. No. 4,785,569, Nov. 22, 1988. Both patents showed removable eyes mounted on a shank or pin that passed through the soft plastic lure body. These devices were not free to move as they were attached rigidly to the lure body. They could be lost from the lure if they were dislodged from the pin during a fish strike or removal from snags. Mangle, U.S. Pat. No. 2,251,593, Aug. 5, 1941, used a wire to attach reflective beads to a spoon type lure to assimilate eyes.

Newman, U.S. Pat. No. 4,035,945, Jul. 19, 1977, used concave discs on the fishing line to cause the fishing lure to have erratic and random motion. As the lure was drawn through the water, the eccentrically mounted discs deflected the water to cause erratic motion in the trailing lure. The discs, being in a position between the line and lure, caused this apparatus to have many points of potential failure for a large fish to break and bend once the fish was hooked.

Glansandro Terreni, in U.S. Pat. No. 3,672,086, Jun. 27, 1972, introduced a fishing lure with interchangeable parts. Two detachable spoon baits projected from the sides of the lure and rather than being stationary, rotated about the long axis of the lure by a propeller blade to which they were attached by connectors.

Bazinet, in U.S. Pat. No. 5,088,226, Feb. 18, 1992, showed a fishing lure with rotational lateral fins that aided movement when the lure was jigged vertically up and down.

Several lures have utilized accessories that grossly resemble the present invention but closer inspection shows they have significant differences. Fury Mgf. Co., in 1952, made a lure named "Charmer" that utilized a wire through the lure body to which 2 treble hooks were attached on each side. Makinen Tackle Co., in 1945, used a wire that extended from each side of it's "Wonderlure" to attach spinner blades. One of the earliest lures to use side wires and ornamentation was Harry Comstock U.S. Pat. No. 271,424, 1883, in his flying heigramite lure.

There has been a tendency in the prior art to make fishing lures more attractive to fish and anglers by adding reflective coloration, eyes, beads, discs, and interchangeable parts. With the tendency toward more catch and release programs in lakes, big fish are becoming harder to catch due to the evolution of the smarter fish. Some fish have seen most everything that is cast at them once before. Therefore, to be able to quickly create new, and sometimes only subtle color combination and appearance changes in lures on the spot quickly, will translate to fishing success. The sequin mounting stud allows these quick changes.

OBJECTS AND ADVANTAGES OF THE SEQUIN MOUNTING STUD

Objects and advantages of the sequin mounting stud are:
(a) to provide quick and easy color changes for the same lure;
(b) to provide quick and easy changes of reflective materials for the same lure;
(c) to provide a system that allows changes in color and reflection of lures that doesn't damage paint on lures or leave sticky adhesive residue;
(d) to provide a system that allows quick and easy changes of predator fish attracting materials, in the form of sequins and rubber materials;
(e) to provide a system to change a lure's color, so that the angler doesn't need to possess the same lure in every possible color;
(f) to provide a method to add erratic movement to a lure;
(g) to provide a system to enhance a lure's life-like qualities so predator fish are more willing to strike;
(h) to potentiate attractive abilities of lures;
(i) to effect color, reflective, and motion changes by using inexpensive reusable materials;
(j) to provide a system that allows new and easily applied color combinations for lures;
(k) to provide versatility that can be applied to most lures to improve their fish attracting nature;
(l) to provide a system that if scratched or damaged, is easy to replace like new in a matter of seconds;
(m) to provide a system where use of several sequins and beads can create many possible color combinations, and present that new look that the predator fish has never seen before;
(n) to give existing lures a new look and new action previously not demonstrated;

(o) to provide a system of color change that is unaffected by soft plastic bait oils that soften and damage paint and plastic on lures;
(p) to provide a system where the angler has the ability to improve and design a lure's appearance beyond what the manufacturer has provided;
(q) to provide a system that is not affected by sunlight heat.

Further objects and advantages of the sequin mounting stud will become apparent from a consideration of the ensuing description and drawings.

BRIEF DESCRIPTION OF DRAWING FIGURES

FIG. 1 shows prior art—simple lead head jig; isometric view.

FIG. 2 shows lead head jig with sequins and sequin mounting stud; isometric view.

FIG. 3 shows sequin mounting stud and sequins; isometric view.

FIG. 4 shows front end view of lead head jig and sequin mounting stud and sequins as they pivot on the mounting stud.

FIG. 5A shows a friction lock type sequin mounting stud; isometric view.

FIG. 5B shows single stud version of the friction lock type sequin mounting stud; isometric view.

FIGS. 6A, 6B, 6C, 6D show types of sequins and mounting holes.

Figure 7:
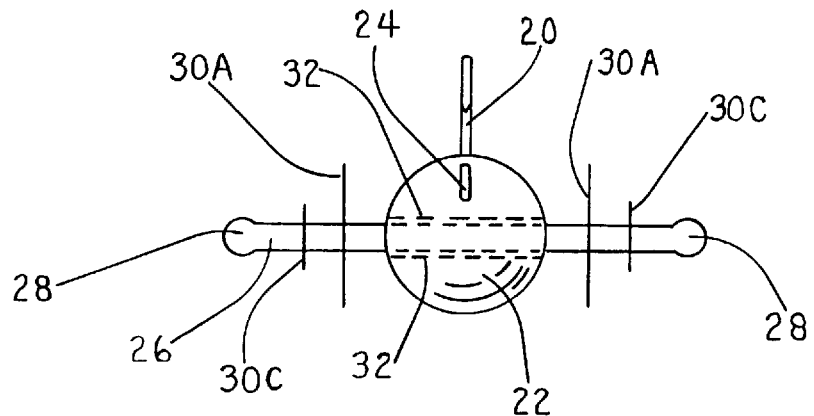
FIG. 7 shows front end view of lead head jig with sequin mounting stud and the use of stacking multisized sequins.

LIST OF REFERENCE NUMERALS IN DRAWINGS 20 fishhook
22 lead jig head
24 hook eyelet
26 sequin mounting stud
28 mounting stud sequin retainer
30A flat hologram reflective sequin
30B multifaceted reflective sequin
30C small sequin
32 mounting stud hole
34 friction lock type sequin mounting stud
35 single stud
36 sequin center mounting hole
38 sequin slotted center mounting hole
40 sequin eccentric mounting hole
42 reflective bead
43 bead hole
44 spinner blade
46 fishing lure body
47 fishing lure diving lip
48 fixed position sequin mounting stud
50 fixed position curved sequin mounting stud
52 curved sequin mounting stud
54 mounting stud flat crimp retainer
56 rubber material

DETAILED DESCRIPTION OF INVENTION DRAWINGS

FIGS. 1 and 2

FIG. 1 is prior art and shows a very simple fishing lure, the lead head jig. It consists of a fish hook 20 with a lead jig head 22 and a hook eyelet 24. FIG. 2 shows the present invention as a part of the lead head jig. A sequin mounting stud 26 passes through lead jig head 22 via mounting stud hole 32. The mesial portion (the portion toward the middle of the lure) of mounting stud 26 occupies a postion inside lead jig head 22. Mounting stud 26 is a plastic monofilament line of 0.7 mm diameter. Mounting stud 26 has a mounting stud sequin retainer 28 of diameter 1.0 mm on each distal end (the end farthest from point of attachment to lure). Between retainer 28 and lead jig head 22 is a flat hologram reflective sequin 30A. Sequin 30A is mounted on mounting stud 26 through a sequin slotted center mounting hole 38. Hole 38 is 0.9 mm in diameter. Sequins 30A are plastic and light reflective and are 0.2 mm in thickness. They can be 5 mm, 8 mm, or 10 mm in diameter and come in a multitude of colors such as red, blue, green, gold, silver, and gray. Sequins 30A have hologram properties that mimic prey fish scales and coloration. The light reflection from sequins 30A is prismatic-like in nature.

FIGS. 3 and 4

In FIG. 3 the present invention is shown with 2 flat hologram reflective sequins 30A mounted on mounting stud 26 and held on by retainers 28. A lead jig head or fishing lure body would generally occupy the space between sequins 30A. Sequins 30A can freely rotate on mounting stud 26.

FIG. 4 shows a front end view of a lead head jig and sequin mounting stud 26 with retainers 28 and loosely fitting sequins 30A. Mounting stud 26 passes through lead jig head 22 through a mounting stud hole 32. Arrows and new position lines indicate pivot motion of sequins 30A.

FIG. 5A

FIG. 5A shows sequins 30A on a friction lock type sequin mounting stud 34. Mounting stud 34 is a 1.0 mm diameter chrome steel wire.

FIG. 5B

FIG. 5B shows sequin 30A on a single stud 35. It is essentially the same as mounting stud 34 (FIG. 5A) except only one half is used.

FIGS. 6A, 6B, 6C, 6D

FIG. 6A shows a multifaceted reflective sequin 30B with a sequin center mounting hole 36. Sequin 30B is a hexagonally faceted plastic material of 0.2 mm thickness and is convex on one side and concave on the other side. Common diameter sizes are 5 mm, 8 mm, and 10 mm. They come in reflective colors white, yellow, red, green, blue, black, pink, gold, silver, orange, purple, pearl, and other variations and mimic the reflective characteristics of prey fish scales. Mounting hole 36 is 0.9 mm in diameter. FIG. 6B shows flat hologram reflective sequin 30A and sequin center mounting hole 36 of diameter 0.9 mm. FIG. 6C shows sequin 30A with a sequin slotted center mounting hole 38. FIG. 6D shows sequin 30A with sequin eccentric mounting hole 40 and center mounting hole 36.

FIG. 7

FIG. 7 shows multiple sequin stacking or the use of different sized sequins in combination. On sequin mounting stud 26 between retainer 28 and jig head 22 is 8 mm diameter sequin 30A and 5 mm diameter small sequin 30C.

FIG. 8

Figure 8:
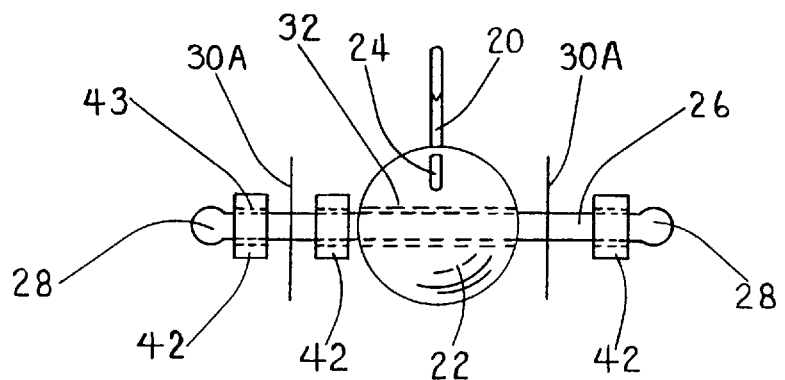
FIG. 8 shows front end view of lead head jig with sequin mounting stud and sequin and bead combination.

FIG. 8 shows reflective bead 42 on mounting stud 26 through bead hole 43. Bead 42 is available in many different sizes, colors, and shapes and comes in over a hundred variations. Bead 42 is the type commonly found in hobby and craft stores and are sewn on clothes in contrast to the orange and brass colored beads more commonly used on spinner bait lures. Beads 42 can be plastic, glass, or metal. Bead 42 is positioned next to sequin 30A and can be used to help retain sequin 30A on mounting stud 26. Bead 42 can also act to space sequin 30A from lead jig head 22.

FIG. 9

Figure 9:
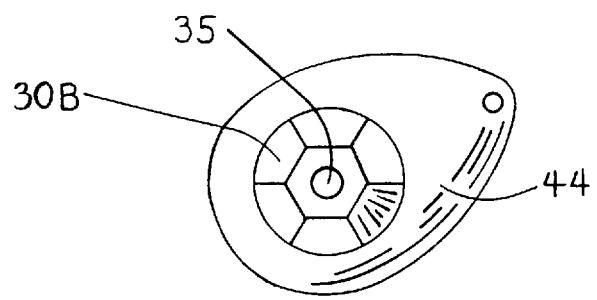
FIG. 9 shows application of sequin mounting stud and sequin on spinner blade.

FIG. 9 shows sequin 30B on a spinner blade 44 retained by single stud 35.

FIG. 10

Figure 10:
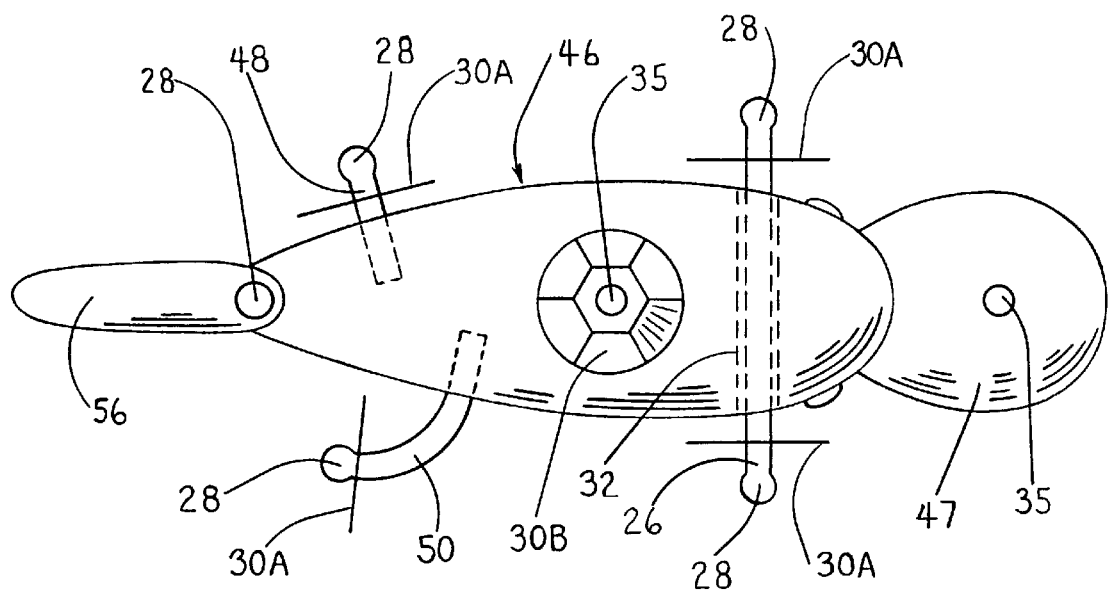
FIG. 10 shows a top view of a common prior art fishing lure body with application of variations of sequin mounting stud, sequins, and sheet rubber material.

FIG. 10 shows a top view of a prior art fishing lure body 46 with present invention applications of a fixed position sequin mounting stud 48 on which sequin 30A is mounted and held on by retainer 28. A fixed position curved sequin mounting stud 50 with retainer 28 holds sequin 30A. Sequin mounting stud 26 passes through lure body 46 by using mounting stud hole 32. Sequin 30A is retained on sequin mounting stud 26 by retainer 28. Sequin 30B is retained by single stud 35. A leech shaped piece of sheet latex rubber material 56 is retained by retainer 28 in the same fashion as sequin 30A is retained. Rubber material 56 comes in three different thicknesses of 0.15 mm, 0.2 mm, and 0.3 mm. Colors of dark gray, almond, green, blue, purple, and pink are available. Rubber material 56 can be cut in any shape desired. Fishing lure diving lip 47 has mounting stud 35 to which sequin 30A, 30B, or 30C can be attached.

FIG. 11

Figure 11:
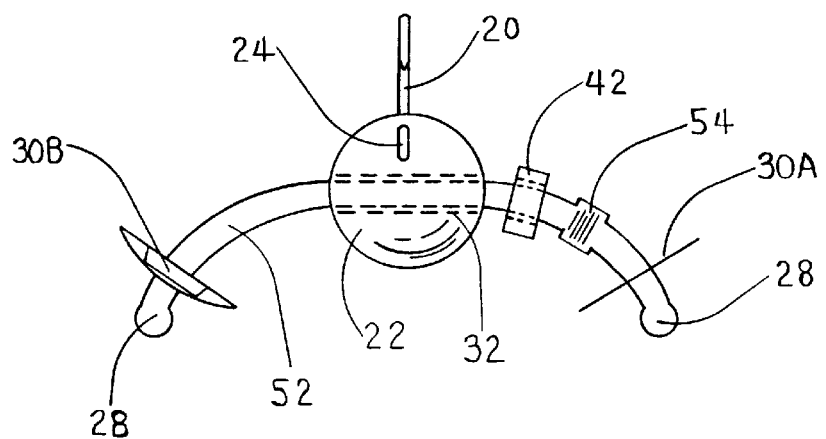
FIG. 11 shows front end view of lead head jig and curved sequin mounting stud with sequin and bead combination.

FIG. 11 shows curved sequin mounting stud 52 passing through mounting stud hole 32 in jig head 22. Bead 42 on mounting stud 52 is separated from sequin 30A by mounting stud flat crimp retainer 54 and sequin 30A is retainer by retainer 28. Sequin 30B is retained by retainer 28 on the other side.

OPERATION OF INVENTION

FIGS. 1–11

General Use

Sequin 30A or sequin 30B with sequin slotted center mounting hole 36 is slipped over (to apply) or slipped off (to remove) of mounting stud retainer 28 of sequin mounting stud 26 to quickly change colors or reflective qualities desired in a fishing lure.

Stud is defined here to mean a projecting nail, pin, or rod. Sequin is defined as a small shining spangle or reflecting plastic material used especially on a costume dress for ornamentation of any shape but most commonly round.

Mounting stud 26 and mounting stud 34 can be placed on lure body 46 and lead jig head 22. Lure body is used very broadly here to refer to any part of a lure and includes diving lip, head, body, tail, or spinner blade. Retainer 28 keeps sequin 30A or sequin 30B on mounting stud 26 due to retainer 28 having a slightly larger size diameter than hole 36. Mounting stud 26 is smaller in diameter than hole 36 allowing sequin 30A or sequin 30B to pivot and turn on mounting stud 26 as shown in FIG. 4. When mounting stud 26 is used on lead jig head 22 and fished in a vertical up and down jigging method, slight movements cause sequins 30A and 30B to pivot and slightly rotate on mounting stud 26 and to mimic the eye movements in a live bait fish. Rotation of sequins 30A and 30B is very slight and is distinguished from rapid churning propeller or spinner blade action. When lead jig head 22 with sequins 30A (or 30B) on mounting stud 26, as in FIG. 4, is retrieved, or used in a flowing stream, sequins 30A (or 30B) pivot and reflect light and tend to cause the lure to move in erratic, darting directions resembling a fleeing bait, like a crawdad or bait fish. Sequins 30A tend to steer the lure as they change directions as they pivot A twitch of the rod tip can initiate the directional changes too. Sequins 30A and 30B being very thin (0.2 mm) and light pivot rather easily on mounting stud 26. Sequin 30B of FIG. 6A, being concave on one side and convex on the other, has the ability to be mounted with either side out to maximize reflective and movement characteristics.

When the present invention, applied to a simple lead head jig, is used on a Jigglelure™ Automatic Jigging Device For Fishing (described by Heuke, U.S. Pat. No. 5,535,538, Jul. 16, 1996), the just previously described actions of pivoting and rotation of sequins 30A and 30B cause the lure to have very random and erratic predator fish attracting and unusual movements. The resulting motion in sequins 30A and 30B create reflections in all directions, thus, attracting predator fish to the immediate area.

Sequin 30 A of FIG. 6C with sequin slotted center mounting hole 38, allows for easier placement and removal of sequin 30A over retainer 28.

Sequin 30A is shown in FIG. 6D with sequin eccentric mounting hole 40. Mounting hole 40, being in an eccentric location gives additional movement and reflective capabilities.

Friction lock type mounting stud 34 in FIG. 5A is to be mounted through a lure in a fixed position. Sequins 30A with sequin center mounting hole are mounted on mounting stud 34. Mounting hole 36 is slightly smaller in diameter than mounting stud 34 diameter size and sequins 30A or 30B can be retained by friction because of this difference. Thus, retainer 28 is unnecessary in this embodiment.

FIG. 5B shows single stud 35, a similar version of mounting stud 34, but the difference being half of mounting stud 34. Single stud 35 is of use for spinner blade 44 (FIG. 9) and diving lip 47 (FIG. 10).

Sequin Stacking

Sequin stacking in FIG. 7 is possible by using different sizes, shapes, types, and colors of sequins. For example small black sequin 30C of 5 mm diameter is mounted lateral to silver sequin 30B of 8 mm diameter to give the appearance of a prey fish eye, with a black pupil. Combined with the ability of this stacking to pivot on mounting stud 26, gives the appearance of fish eye movement in the lure. The lure eye is particularly important and is included in most lures by some fashion of a painted dark pupil. Predator fish tend to focus on this eye spot and it plays an important role in how the predator fish might initiate the attack. So the movement of sequins 30B and 30C to mimic eye movement in the prey fish is a significant action to promote striking the lure. Sizes, types, shapes, and colors can be mixed and matched to create the fisherman's desired deadly combination for the lure.

Use of Reflective Beads

Additional combination variability (FIG. 8) can include reflective beads 42 on mounting stud 26 distal or mesial to sequin 30A. The use of beads 42 mounted distal to multifaceted sequin 30B, concave side out (not shown), gives a magnified reflective combination as light hits bead 42, reflects to sequin 30B and away from sequin 30B to the predator fish's eye. Reflective beads 42 come in many colors and combined with sequin 30A or 30B give a multitude of possible combinations. Beads 42 come in variations of over a hundred, to show their potential for use in this fashion.

When beads 42 are mounted on mounting stud 26 distal to sequins 30A or 30B they aid to retain sequins 30A or 30B. Beads 42 will not slip over retainer 28, and thus sequins 30A or 30B are no longer removable if sequin center mounting hole 36 is used. Sequin slotted center mounting hole 38 allows sequins 30A and 30B to slip over beads 42 when used. The main advantage of beads 42 are 1) to act as a retainer; 2) to provide additional reflective and color potential; 3) to act as spacers so sequins 30A or 30B can rotate and pivot freely. A new and unexpected result, is that when silver diamond style beads 42 are used, they reflect light in such a fashion that the lure appears to have glowing eyes, making fish able to see the lure more easily. Beads 42, being mounted outside the lure body reflect considerably more light than lure eyes embedded in the lure, and that is why they appear to glow.

When beads 42 are used only mesial to sequins 30A or 30B they can serve as a spacer between sequins 30A or 30B and lead jig head 22. In this arrangement sequins 30A or 30B are able to be detachable over retainer 28. When beads 42 are used as a retaining aid, sequins 30A or 30B can use sequin slotted center mounting hole 38 for more freedom to pass over bead 42 when exchanging sequins 30A or 30B.

Other Uses And Variations of The Sequin Mounting Stud

FIGS. 9 and 10 show single stud 35 with sequin 30A or sequin 30B can have applications to spinner blade 44, fishing lure body 46, and diving lip 47. With some modification to mounting stud 26 another embodiment shows fixed position sequin mounting stud 48 which is mounted in lure body 46 at any desired location such as the tail, head, or mid-body to achieve the desired effect.

Another embodiment uses fixed position curved sequin mounting stud 50 (FIG. 10), with further potential for attractive change of lure action.

In addition to allowing quick changes of sequin 30A, or sequin 30B, rubber material 56 can be easily attached (or removed) and retained by retainer 28.

When sequin 30A or 30B is mounted on the top surface of a lure that is difficult to see, an additional advantage is that the angler can easily see the lure's location from the reflection of sequin 30A or 30B. This aids retrieval of the lure through heavy brush to prevent snagging of the lure.

Curved sequin mounting stud 52 in FIG. 11 shows an embodiment with mounting stud flat crimp retainer 54 as another way to retain bead 42 in position.

Procedure For Placement of Sequin Mounting Stud

Sequin mounting stud 34 (and single stud 35) can easily be cast in lead jig head 22. By placing sequin mounting stud 34 of chrome wire in the mold prior to casting, it can be embedded in the casting when poured. Mounting stud 34 is held in position in the mold by placing it in a hole through the mold. After casting, mounting stud 34 is left in place for friction lock type sequin mounting stud 34 as the cast lead holds it firmly in place. However, if sequin mounting stud 26 of monofilament is desired, mounting stud 34 is removed and replaced with monofilament. The ends of the monofilament are heated to form retainers 28.

CONCLUSION, RAMIFICATIONS, AND SCOPE

Accordingly, the reader can see this accessory for lures is able to provide quick and easy coloration, reflection, and motion changes for the same lure with the use of sequins, beads, and latex materials mounted as the specification suggests. The angler will not need many colors of a single lure, but can use a single lure to build upon, and thus reduce the load in his tackle box. Sequins can be simply added or removed as the angler designs and creates his own new color combinations in an economical way.

The sequins and beads won't harm lure plastic or paint nor are the sequins and beads affected by soft plastic bait oils. They will not leave a sticky adhesive residue when changing as lure tapes sometimes leave. Slight movement of sequins and beads provide some new eye simulation movements and lure retrieval through the water creates some new erratic, life-like escape motion, that attract the fish's eye. Occasionally a fish strikes extremely hard and sequins bend or come off during the time when a fish is landed, but this is not a problem as they can easily be replaced with new inexpensive sequins.

Although the above contains many specifications, these should not be construed as limiting the scope of the invention, but merely providing illustrations of some of the presently preferred embodiments of this invention. For example, the sequin mounting stud could be metal, plastic or some other rigid or semi-rigid material. The mounting stud and sequin mounting hole could be another geometric shape other that round. The mounting stud retainer is a round ball shape but other types of retainers could be used. Other materials besides sequins, beads, or rubber could be attached on the mounting stud. Other shapes besides hexagonal faceted and round sequins could be used. The sizes and measurements are only to illustrate a working example, as bigger fish require bigger sizes. It might be that an angler doesn't want the ability to change the sequins and may want them permanently mounted to just take advantage of the erratic, random motion feature of the present invention. Flat sequins are depicted in most applications described, but these sequins and multifaceted sequins are interchangeable in all the embodiments discussed. The lead head jig type lure is used only as a model to describe the accessory and not to be construed as the present invention's only application. The sequin mounting stud can have an application to most any lure.

Thus, the scope of the invention should be determined by the appended claims and their legal, equivalents, rather than by the examples given.

Having thus described the invention I claim:

1. A fishing device and accessory to part of a lead headed jigging fishing lure comprising:

(a) a lead head with two lateral sides;

(b) a mounting stud hole passing through said lead head from one lateral side to the other lateral side;

(c) a sequin mounting stud having two ends;
   with said sequin mounting stud mounted in said mounting stud hole;

(d) a mounting stud retainer on each end of said sequin mounting stud with a portion of said sequin mounting stud protruding from said lead head with one said mounting stud sequin retainer being on each lateral side of said lead head;

(e) a plurality of circular light reflective plastic sequins with each sequin having a concave side and a convex side;
   substantially 0.2 millimeter uniform thickness and hexagonal faceted on both sides;

(f) a sequin center mounting hole in each of said sequins with said sequins being mounted on said sequin mounting stud, the diameter of the sequin stud mounting hole being slightly larger than the diameter of said sequin mounting stud.

2. A fishing device and accessory of claim 1 further comprising a plurality of smaller and different colored sequins mounted on said sequin mounting stud adjacent said sequin so that reflective is enhanced.

3. A fishing device and accessory of claim 1 further comprising a circular flat hologram sequin mounted on said sequin mounting stud adjacent said sequin to further enhance reflection.

4. A fishing device and accessory to be part of a lead headed jigging fishing lure so that color change, reflection, and motion are effectively enhanced, comprising:
 (a) a lead head on a jigging lure;
  (I) said lead head having two lateral sides;
 (b) a stud mounting hole passing through said lead head from one lateral side to the other lateral side;
 (c) a sequin mounting stud located in said stud mounting hole; said sequin mounting stud and said stud mounting hole passing through said lead head in a direction substantially transverse to a long axis of the lure, said sequin mounting stud being fixed in a position in said stud mounting hole, a portion of said sequin mounting stud protruding laterally from said lead head on each lateral side, said sequin mounting stud being straight;
 a plurality of sequins, said sequins being circular and having two distinct sides, one side being concave and the other side being convex, hexagonal faceted on both sides, plastic, substantially 0.2 millimeters uniform thickness and light reflective;
 a sequin center mounting hole in each sequin having a diameter slightly smaller than a diameter of said sequin mounting stud, said sequins being mounted on said sequin mounting stud through said sequin center mounting hole and retained on said sequin mounting stud by friction from a size difference between said sequin center mounting hole and said sequin mounting stud, with at least one sequin mounted on said sequin mounting stud on each lateral side of said lead head whereby sequins can be slipped over said sequin mounting stud to exchange sequins.

5. The fishing accessory of claim 4, further including successively smaller and different colored sequins being mounted on said sequin mounting stud so that colors an be mixed for enhanced reflective effect.

6. The fishing accessory of claim 4 further including a circular flat hologram sequin placed on said sequin mounting stud so that reflection is further enhanced.

* * * * *